(12) United States Patent
Haage et al.

(10) Patent No.: US 6,328,271 B1
(45) Date of Patent: Dec. 11, 2001

(54) HOLDER FOR A MOBILE TELEPHONE

(75) Inventors: Manfred Haage, Dornstetten; Bernd Plocher, Rottenburg-Seebronn, both of (DE)

(73) Assignee: Fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/509,512

(22) PCT Filed: Sep. 9, 1998

(86) PCT No.: PCT/EP98/06013

§ 371 Date: Mar. 29, 2000

§ 102(e) Date: Mar. 29, 2000

(87) PCT Pub. No.: WO99/20487

PCT Pub. Date: Apr. 29, 1999

(30) Foreign Application Priority Data

Oct. 22, 1997 (DE) .......................................... 297 18 761 U

(51) Int. Cl.[7] ....................................................... A47F 5/00
(52) U.S. Cl. ..................... 248/288.31; 224/558; 224/929; 248/288.51; 248/289.11; 379/449; 379/455
(58) Field of Search ................................. 248/181.1, 133, 248/346.01, 349.1, 288.11, 288.31, 288.51, 481, 484; 224/558, 929, 276; 379/455, 454, 449

(56) References Cited

U.S. PATENT DOCUMENTS

| | | | |
|---|---|---|---|
| 357,337 | * 2/1887 | Rosenblatt | 248/276.1 |
| D. 406,591 | * 3/1999 | Richter | D14/253 |
| 2,875,973 | * 3/1959 | Hull | 248/288.31 X |
| 4,066,231 | * 1/1978 | Bahner et al. | 248/203 X |
| 4,445,228 | * 4/1984 | Bruni | 224/413 X |
| 4,617,430 | 10/1986 | Bryant . | |
| 5,179,590 | * 1/1993 | Wang | 379/454 |
| 5,187,744 | * 2/1993 | Richter | 379/449 |
| 5,503,313 | * 4/1996 | Wei | 224/197 |
| 5,799,914 | * 9/1998 | Chivallier et al. | 248/176.1 |
| 5,845,885 | * 12/1998 | Carnevali | 248/288.31 X |
| 5,979,724 | * 11/1999 | Loewenthal et al. | 224/483 |

FOREIGN PATENT DOCUMENTS

| | | |
|---|---|---|
| 41 07 997 A | 9/1972 | (DE) . |
| 296 01 412 U | 5/1996 | (DE) . |
| 295 21 459 U | 4/1997 | (DE) . |
| 0 384 172 A | 8/1990 | (EP) . |

* cited by examiner

Primary Examiner—Ramon O. Ramirez
Assistant Examiner—Tan Le
(74) Attorney, Agent, or Firm—Michael J. Striker

(57) ABSTRACT

The invention relates to a holder for a mobile telephone that has a fastening device for mounting the holder (10) in a motor vehicle. In order to be able to use the holder universally, the fastening device (12) is in the form of a three-point fastening having three fastening feet which are attached to the fastening device (12) at the corners of a notional triangle. To enable the fastening feet to pivot in any direction, the fastening device (12) has a multi-directional pivot bearing for each fastening foot.

8 Claims, 2 Drawing Sheets

HOLDER FOR A MOBILE TELEPHONE

BACKGROUND OF THE INVENTION

1. Field of the Invention

The present invention relates to a holder for a mobile telephone. "Mobile telephone" is to be understood to mean an apparatus having the approximate shape and size of a telephone receiver.

2. Prior Art

Such holders are known per se. They serve to hold a mobile telephone in a position in a motor vehicle that enables a driver to use the mobile telephone without having to hold the mobile phone in one hand. Holders are known that have, for example, a clamping device having adjustable gripping jaws that engage sides of the mobile telephone and are thus suitable for holding different types of mobile telephone. Holders are also known that are especially suited to a particular mobile telephone and can only be used for that mobile telephone. The known holders have a fastening device for mounting the holder, for example, on a dashboard or on a central console of the motor vehicle.

SUMMARY OF THE INVENTION

It is an object of the present invention to develop a holder for a mobile telephone that can be used universally.

The holder according to the invention has a three-point fastening having three fastening feet that are attached to the fastening device at the corners of a notional triangle. The fastening feet can be pivoted in any direction, for example, by ball-and-socket articulations. The three-point fastening firstly has the advantage that it is a mechanically defined fastening.

Each fastening foot rests on a fastening surface, that is to say, for example, on the dashboard or on the central console of the motor vehicle. Owing to their ability to pivot in any direction when the holder is being fastened, the fastening feet adapt to the shape of the fastening surface, for example a convexly dr concavely curved fastening surface. This ensures a maximum fastening force of each fastening foot against a fastening surface and stress-free mounting of the holder in the motor vehicle. The holder according to the invention adapts to fastening surfaces virtually of any shape. A further advantage of the three-point fastening is that, owing to the fastening by three fastening feet, it is able to absorb large forces and, owing to the distance between the fastening feet, it is able to absorb high moments, such as occur as a result of loading of the holder by a lever arm to the fastening device. The fastening feet can be mounted in the motor vehicle, for example by being adhesively secured or by means of screws.

In order to be able to direct the mobile telephone towards the driver in such a manner that its keypads can be easily seen and used, a display can be read easily and a microphone and a loudspeaker of the mobile telephone are directed towards the driver, in an embodiment of the invention the holder has a pivot bearing, by means of which a holding portion that receives the mobile telephone can be pivoted relative to the fastening device of the holder. By means of the pivot bearing, the mobile telephone can be directed with respect to the driver to a good position for the driver to use the telephone, irrespective of the spatial position of the fastening surface in the motor vehicle on which the holder is mounted.

In order to fix the mobile telephone in its adjusted position, in a development, the holder according to the invention has an immobilizing device by means of which the pivot bearing can be fixed in any position. The immobilizing device prevents the holder from becoming displaced unintentionally. The adjusted position of the mobile telephone is reliably maintained even under the stresses that occur during the journey.

In a development of the invention, the holder has a safety device for the pivot bearing, which holds the pivot bearing and thus also the holder together, even when the immobilizing device has been released. This prevents the holder from coming apart into several pieces, for example after slackening and full unscrewing of a clamping screw of the immobilizing device. The safety device enables the position of the mobile telephone to be adjusted, by pivoting, after the immobilizing device has been released, and thus ensures that the mobile telephone continues to be held.

The pivot bearing preferably enables the mobile telephone to pivot in any direction in order to provide as many adjustment options as possible for the position of the mobile telephone.

In an embodiment of the invention, a dome-like articulation is provided as pivot bearing, that is to say an articulation having a hollow dome which is engaged from behind through an opening by a plate-like disk or the like, which is connected to the holding portion that receives the mobile telephone, the holding portion resting on the outside of the hollow dome so as to be displaceable along its surface.

In order to increase the range of angled adjustment of the mobile telephone beyond the pivot range of the pivot bearing, in an embodiment of the invention the holding portion that receives the mobile telephone is so constructed as to be able to be mounted on the pivot bearing in various angled positions.

In order to make the holder usable for different types of mobile telephone, an adapter is provided which can be connected to the mobile telephone, for example by being adhesively secured thereto. The adapter is releasably mounted on the mobile-telephone-receiving holding portion of the holder according to the invention. The adapter can also be arranged to be releasably connected to the mobile telephone. The adapter enables the mobile telephone to be removed rapidly from the holder according to the invention and to be mounted thereon rapidly and securely in position. The adapter can be used with a holder having three-point fastening and also with a holder having a different type of fastening.

The holder preferably has a locking device having a so-called push-push mechanism having, for example, a heart-shaped curve. The locking device locks the adapter on the mobile-telephone-receiving holding portion of the holder when the adapter is pressed against the holding portion and releases the adapter when the adapter is pressed against the holding portion again. The locking device has the advantage that the mobile telephone can be mounted on the holder by simply pressing it against the holding portion and can be removed by pressing against the mobile telephone again, additional manual operations for locking or releasing it being unnecessary.

BRIEF DESCRIPTION OF THE DRAWINGS

The invention will be explained hereinafter in greater detail with reference to an embodiment shown in the drawings, in which.

DESCRIPTION OF THE PREFERRED EMBODIMENT

Figure 1:
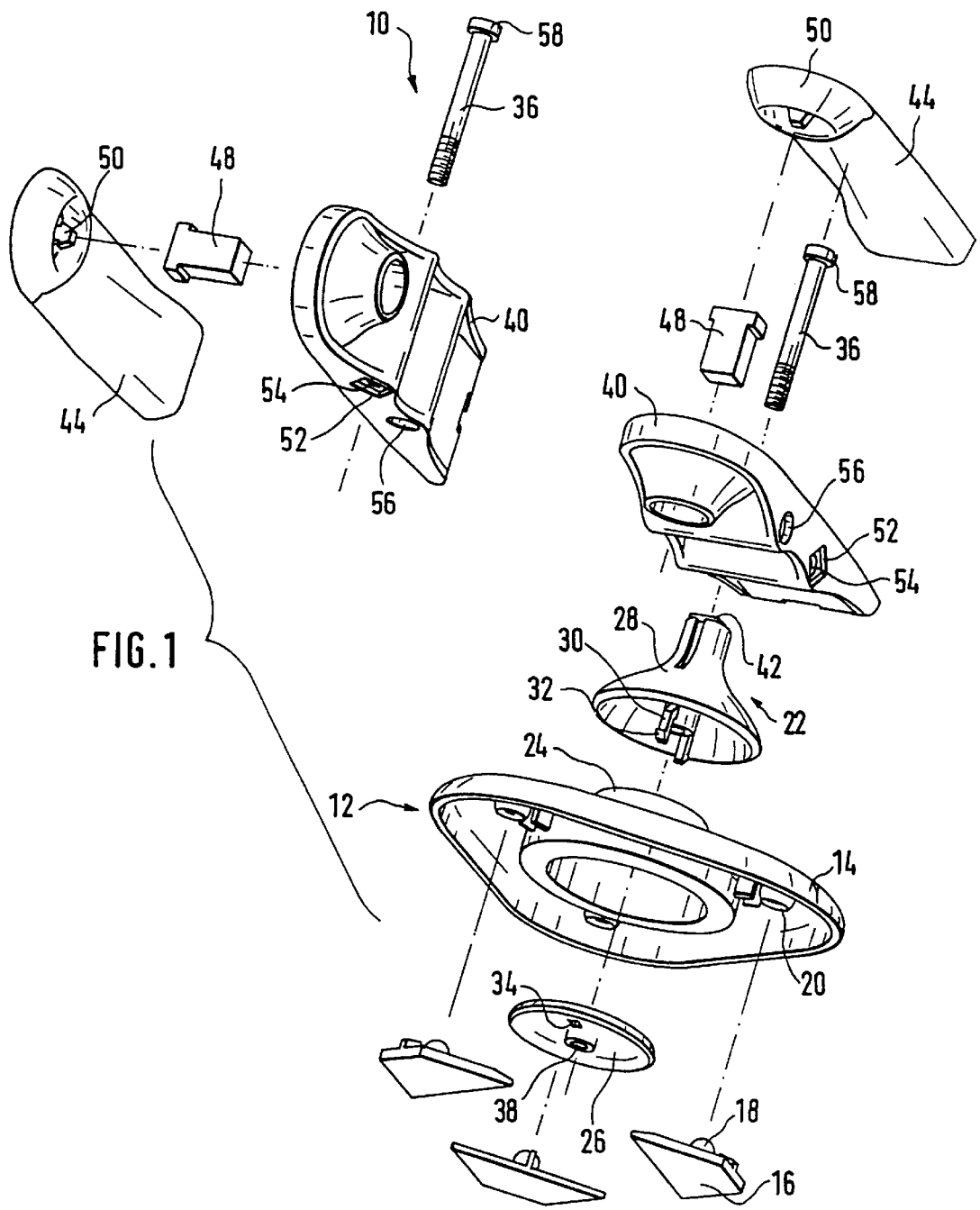
FIG. 1 is an exploded perspective view of a holder according to the invention.

The holder according to the invention for a mobile telephone (not shown), shown in the drawings and denoted as a whole by the reference numeral 10, has a fastening device 12 for fastening the holder 10, for example, to a dashboard or to a central console of a motor vehicle. The fastening device 12 comprises a base plate 14 that, in a plan view, is essentially in the shape of an equilateral triangle having rounded corners. Mounted on the underside of the base plate 14 in the region of its corners are three plate-like fastening feet 16. The fastening feet 16 are mounted, articulated, on the base plate 14 by means of ball-and-socket articulations 18, 20 so as to be able to pivot in any direction. The ball-and-socket articulations 18, 20 have an articulation ball 18 that is integral with the fastening feet 16 and is received in a complementary articulation socket 20 that is integral with the base plate 14. In order to be able to fasten the holder 10 in the motor vehicle, undersides of the fastening feet 16 are of self-adhesive construction, for example having a stuck-on foam rubber strip known per se that is coated with a self-adhesive film.

In order to be able to pivot a mobile telephone that is received by the holder 10 according to the invention in any direction, the holder 10 according to the invention has a dome-like articulation 22 as pivot bearing: the base plate 14 has projecting from the centre of its surface a hollow dome 24 which is provided with a central hole (not visible in the drawing). Inside the hollow dome 24 there is a plate-like disk 26, the rim of which is curved to match the inner curvature of the hollow dome 24. On the outside of the hollow dome 24 there is a carrier 28, which is approximately in the shape of a funnel, the wide end of which has a concave spherical-shaped inner curvature that complements the outer curvature of the hollow dome 24, by means of which inner curvature the carrier 28 rests on the hollow dome 24. The carrier 28 has two resiliently formed snap-in fingers 30 having snap-in lugs 32 at their free ends. The snap-in fingers 30 engage through the central hole (not visible in the drawing) of the hollow dome 24 of the base plate 14. The snap-in fingers 30 also engage through openings 34 in the plate-like disk 26, the snap-in lugs 32 at the free ends of the snap-in fingers 30 engaging behind the plate-like disk 26. The carrier 28 located on the outside of the hollow dome 24 is connected to the plate-like disk 26 located on the inside of the hollow dome 24 by means of its snap-in fingers 30 having the snap-in lugs 32. The carrier 28 can be displaced on the hollow dome 24 in any direction, the plate-like disk 26 moving correspondingly with the carrier 28 on the inside of the hollow dome 24. As a result of the displacement of the carrier 28 on the hollow dome 24, the carrier 28 is pivoted with respect to the base plate 14. The diameter of the central hole (not visible) of the hollow dome 24 allows displacement of the carrier 28 on the hollow dome 24 and thus pivoting of the carrier 28. The plate-like disk 26 connected to the carrier 28 holds the carrier 28 against the hollow dome 24.

A clamping screw 36, which is screwed into a threaded hole 38 in the centre of the plate-like disk 26, engages through the carrier 28. The plate-like disk 26 and the clamping screw 36 form an immobilizing device of the holder i 0 according to the invention. By tightening the immobilizing screw 36, the carrier 28 is fixed in its then present position on the hollow dome 24 of the base plate 14 and thus is fixed with respect to the base plate 14 at the angle of the carrier 28 that has just been set. The snap-in fingers 30, which engage behind the plate-like disk 26 by their snap-in lugs 32, together with the plate-like disk 26 form a safety device for the holder 10. They hold the carrier 28 against the hollow dome 24 of the base plate 14 even when the clamping screw 36 has been fully unscrewed.

Figure 2:
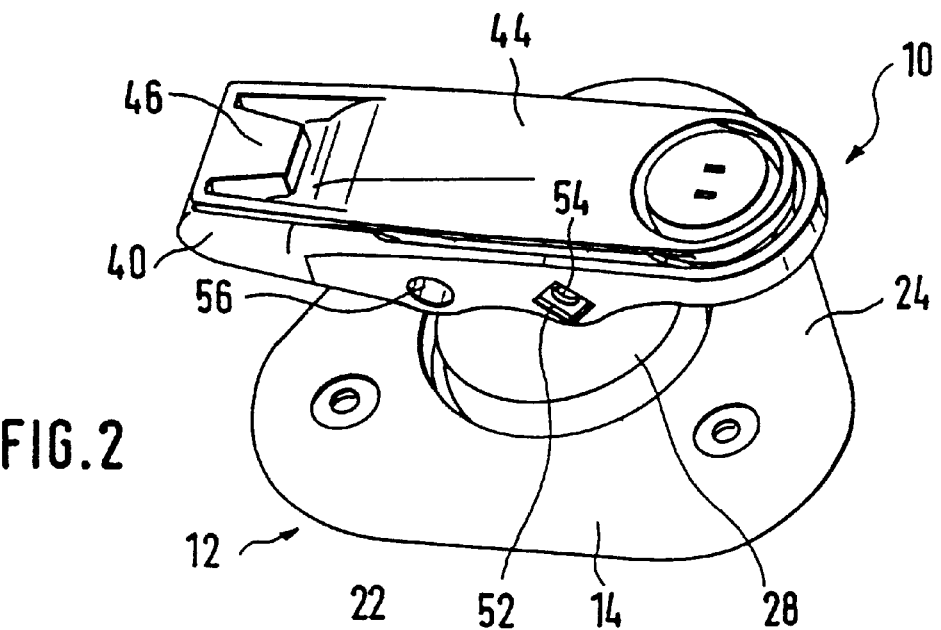
FIGS. 2 and 3 are perspective views showing the assembled holder of FIG. 1 in two positions.
Figure 3:
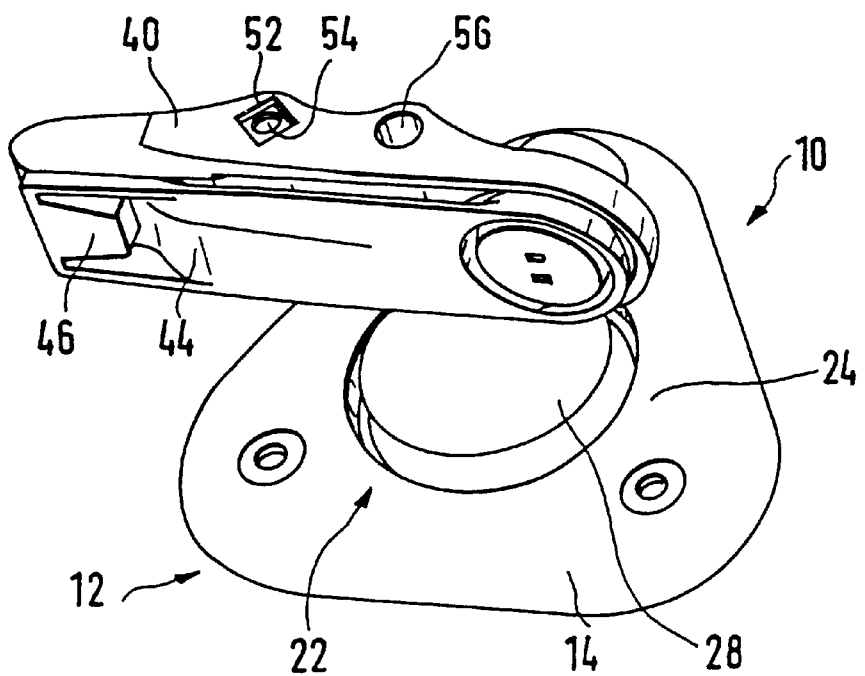

An elongate approximately plate-like holding portion 40 is positioned on the carrier 28. The holding portion 40 has on its underside a square socket (obscured in the drawing) by means of which it is positioned on a square member 42 of the carrier 28. The holding portion 40 is held on the carrier 28 by the clamping screw 36, which also engages through the holding portion 40. An elongate adapter 44 is releasably connected to the holding portion 40. The adapter 44 has a lug seat 46 (FIGS. 2 and 3) at one end, with which it engages round a lug (not visible in the drawing) resting therein that is integral with the holding portion 40. By means of the lug seat 46 engaging round the lug, one end of the adapter 44 is in engagement with the holding portion 40.

At the other end of the adapter 44 and holding portion 40 is a locking device having a so-called push-push mechanism 48 for the releasable fastening of the adapter 44 to the holding portion 40. The push-push mechanism 48 has inside it a heart-shaped curved control element (not visible in the drawing). Such push-push mechanisms 48 are known per se to the person skilled in the art and will therefore not be explained here. The push-push mechanism 48 is inserted securely in the holding portion 40. The push-push mechanism 48 has two anchor bolts (not visible in the drawing) which project outwards from the push-push mechanism 48 at an angle from one another when the push-push mechanism 48 is in the released position and which are retracted into the push-push mechanism 48 and moved towards one another in a locking position. The anchor bolts engage behind a hammer head 50 of a locking peg that is integral with the adapter 44.

To lock the adapter 44 to the holding portion 40, the locking peg together with its hammer head 50 is pressed against the anchor bolts of the push-push mechanism 48 that are in their released position, the anchor bolts moving into the push-push mechanism 48, engaging with the hammer head 50 and thereby locking the adapter 44 in the push-push mechanism 48 and thus to the holding portion 40. To release it, the adapter 44 is pressed briefly against the push-push mechanism 48, as a result of which its anchor bolts are released and move to their released position in which they project outwards from the push-push mechanism at an angle from one another and release the adapter 44. The adapter 44 can be removed from the holding portion 40.

The adapter 44 is connected to the mobile telephone (not shown), for example, by being adhesively secured thereto, as a result of which the mobile telephone can be mounted on the holder 10 and removed therefrom again in simple manner. For the adhesive securing, the adapter 44 can be provided with a self-adhesive film, for example by attaching a self-adhesive strip known per se.

In order to be able to mount the mobile telephone on the holder 10 also at angled positions that the limited pivot range of the dome-like articulation 22 does not per se allow, the holding portion 40 has two further square sockets 52. These two square sockets 52 are located on the two long sides of the holding portion 40 and are offset in relation to one another in the longitudinal direction of the holding portion 40. By means of those square sockets 52 the holding portion 40 can be positioned on the square member 42 of the carrier 28 in a position pivoted by 90° about its notional longitudinal axis. The position of the holding portion 40 in which its underside is positioned on the carrier 28 is shown in FIG. 1 in continuation of the carrier 28 and in FIG. 2. One of the two angled positions, rotated by 90° relative thereto, in which the holding portion 40 can be mounted and attached to the carrier 28 is shown in FIG. 1 to the left of the holding portion 40 that is positioned with its underside on the carrier 28, and also in FIG. 3. There is always only one holding portion 40 on the carrier 28. The double view of the holding portion 40 together with the adapter 44 and the push-push mechanism 48 shown in FIG. 1 serves merely to illustrate the two different angled positions, rotated by 90° relative to one another, in which the holding portion 40 can be mounted on the carrier 28.

The holding portion 40 positioned with a long side on the carrier 28 is also fastened by the clamping screw 36, which is inserted through a hole 54 in the centre of the square socket 52 and is screwed into the plate-like disk 26, engaging through the carrier 28. The diameter of a hole 56 in an opposite long side of the holding portion 40, which hole 56 is in registration with the hole 54 in the square socket 52, allows a head 58 of the clamping screw 36 to pass through so that the head 58 is located on the inside of the long side of the holding portion 40 positioned on the square member 42 of the carrier 28, so that it is not necessary for the clamping screw 36 to be longer by the width of the holding portion 40.

We claim:

1. Holder for a mobile telephone, comprising a fastening device for mounting the holder in a motor vehicle, the fastening device (12) being in the form of a three-point fastening having three fastening feet (16) that are attached to the fastening device (12) at the corners of a notional triangle, the fastening device (12) including a multi-directional pivot bearing (18, 20) for each fastening foot (16), by means of which the fastening feet (16) are mounted on the fastening device (12) so as to be pivotable in any direction; a holding portion (40) for receiving a mobile telephone; and a pivot bearing (22) for fastening the holding portion to the fastening device so as to be pivotable, said pivot bearing including an immobilizing device (26, 36) and a safety device (30, 32) which holds the pivot bearing together even when the immobilizing device is completely released.

2. Holder according to claim 1, wherein the multi-directional pivot bearings have ball-and-socket articulations (18, 20).

3. Holder according to claim 1, wherein the pivot bearing (22) can be pivoted in any direction.

4. Holder according to claim 3, wherein the pivot bearing (22) has a dome-like articulation.

5. Holder according to claim 1, wherein the holder (10) further comprises an adapter (44) that can be connected to a mobile telephone when the mobile telephone is received in the holding portion (40) and the adapter (44) is releasably mounted on the holding portion (40) for receiving the mobile telephone.

6. Holder according to claim 5, and further comprising a locking device (48, 50) which releases the adapter (44) from the holding portion (40) when the adapter (44) is pressed against the holding portion (40) and which locks the adapter (44) to the holding portion (40) again when pressed against the holding portion (40) again.

7. Holder for a mobile telephone, comprising a fastening device for mounting the holder in a motor vehicle, the fastening device (12) being in the form of a three-point fastening having three fastening feet (16) that are attached to the fastening device (12) at the corners of a notional triangle; the fastening device (12) including a multi-directional pivot bearing (18, 20) for each fastening foot (16), by means of which the fastening feet (16) are mounted on the fastening device (12) so as to be pivotable in any direction; a holding portion (40) for receiving a mobile telephone; and a pivot bearing (22) for fastening the holding portion to the fastening device so as to be pivotable, the holding portion (40) for receiving a mobile telephone including a further fastening device (52, 54) for fastening the holding portion to the pivot bearing (22), the further fastening device enabling the holding portion (40) to be fastened to the pivot bearing (22) in at least two different angled positions.

8. Holder for a mobile telephone, comprising a fastening device for mounting the holder in a motor vehicle; a holding portion for receiving a mobile telephone, and an adapter (44) that can be connected to a mobile telephone when the mobile telephone is received in the holding portion (40) and the adapter (44) being releasably mounted on the holding portion (40) for receiving the mobile telephone, the holder further comprising a locking device (48, 50) which releases the adapter (44) from the holding portion (40) when the adapter (44) is pressed against the holding portion (40) and which locks the adapter (44) to the holding portion (40) again when pressed against the holding portion (40) again.

* * * * *